Figure 4:
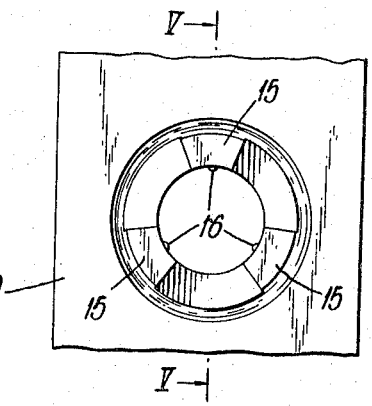

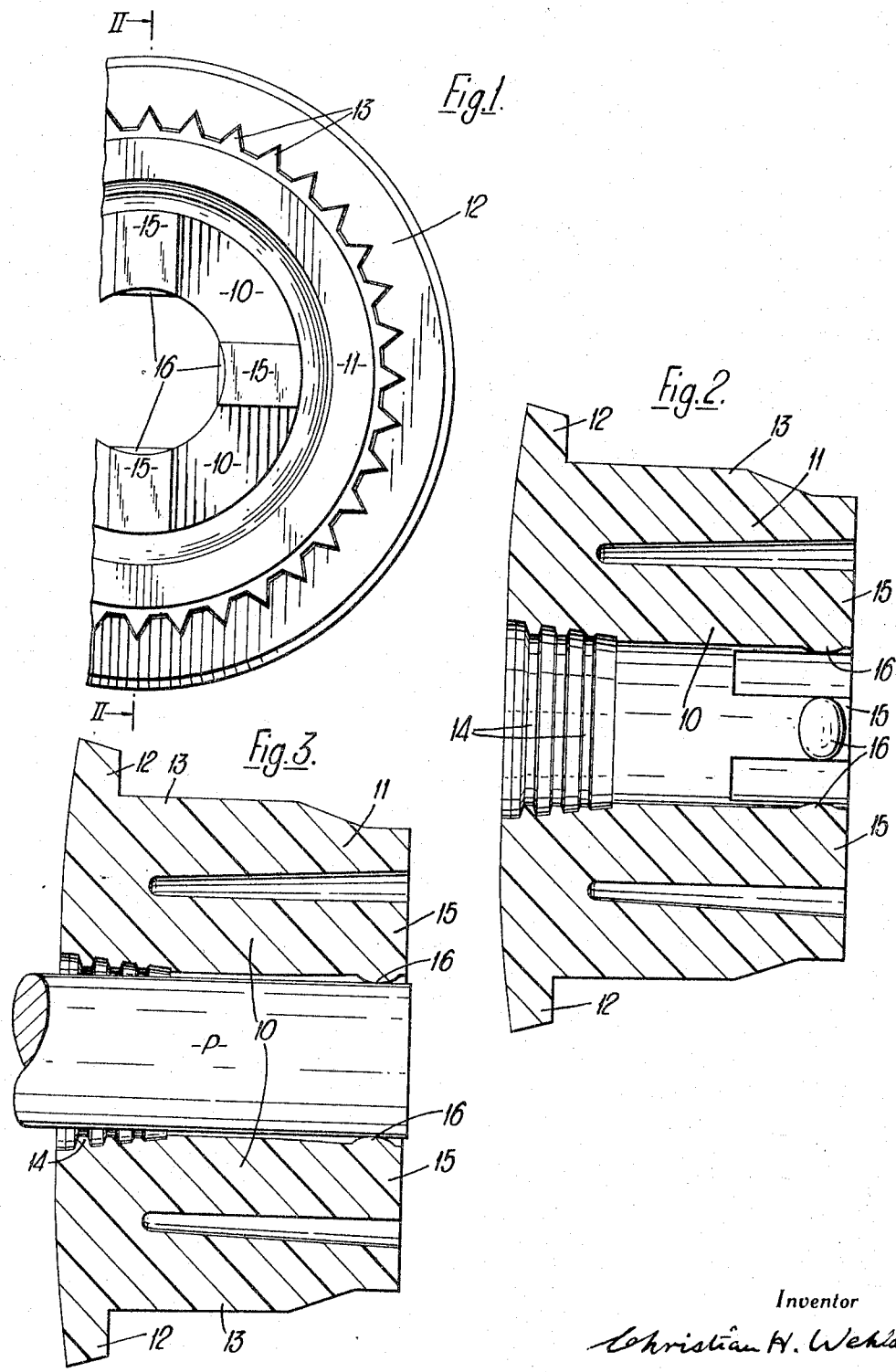

Inventor
Christian H. Wehlau

United States Patent Office 3,317,255
Patented May 2, 1967

3,317,255
PIVOT PIN BEARING ARRANGEMENT
Christian Henry Wehlau, The Grove, Crouch End,
London, England
Filed Feb. 1, 1965, Ser. No. 429,683
Claims priority, application Great Britain, Nov. 25, 1964,
47,857/64
4 Claims. (Cl. 308—37)

This invention relates to bearing arrangements for pivot pins, which arrangements are particularly but not exclusively suitable for use in the actions of upright and grand pianofortes. The term "pivot pins" as used herein is intended to include spindles and other elements which are supported in bearing arrangements for rotation or rotary oscillation.

For economy and various other reasons it is customary and preferable to make some moving parts of pianoforte actions and keyboards of wood: for example in a typical pianoforte action the hammer butt is of wood and is pivotally mounted between the side pieces of a slotted wooden hammer butt flange by means of a metal pivot pin which extends through the hammer butt and is gripped therein, the end portions of the pivot pin being accommodated in bearing bushes held in apertures in the side pieces of the flange. The bushes may be of felt or cloth, and the object is to avoid both undue friction and looseness as far as possible. A disadvantage with such an arrangement is that the side pieces of the wooden flanges may swell or shrink sufficiently to compress the bushes and cause undesirable friction in unfavourable conditions of atmospheric humidity or temperature. Other disadvantages with these arrangements with wooden flanges are the cost of the felt or cloth bushes and the costs of the skilled labour involved in fitting them.

It has therefore been proposed to make some parts of pianoforte actions (for example the hammer butt flange, lever flange, jack, and damper flange) of synthetic plastics materials. Although these parts are then dimensionally stable in varying atmospheric conditions and the bearing bushes may be omitted, it is difficult or impossible with economical manufacturing techniques consistently to avoid either undue friction or undue looseness. For example it is not cheap to manufacture to within a tolerance of plus or minus 0.0001 inch on the diameters of the metal pins and of the apertures which receive the pins in the side pieces of the flanges, yet even with such small tolerances it is found that some actions are "sticky" because of undue friction and others have a slight looseness which gives rise to an unpleasant chatter.

The invention is therefore intended to provide an improved bearing arrangement for a pivot pin.

According to the invention a bearing arrangement for a pivot pin is provided with at least one resilient tongue for exerting radial resilient pressure against a pivot pin located in the bearing arrangement. The or each resilient tongue is preferably provided with a protuberance having a convexly rounded surface to make point contact or contact over a small area with the pivot pin. The resilient tongue or tongues may advantageously be formed integrally with the body of the bearing arrangement, which may conveniently be made of a suitable synthetic plastics material by moulding. The bearing arrangement may be in the form of a bush or other part adapted to be inserted in or secured to a component of a pianoforte action or other mechanism, or the bearing arrangement may be formed integrally with such a component. It is preferred to provide each bearing arrangement with four equally-spaced resilient tongues. Further features of the invention appear from the following description and the accompanying drawings.

Figure 5:
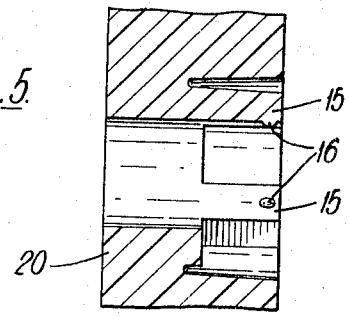
Figure 6:
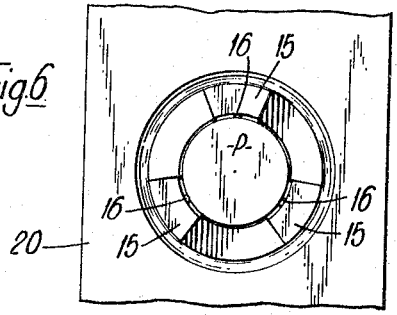

In the accompanying drawings two bearing arrangements in accordance with the invention are illustrated by way of example, FIG. 1 being a partial end view of a bearing bush embodying the invention, FIG. 2 an elevation in section on the line II—II in FIG. 1, FIG. 3 a view corresponding to FIG. 2 but showing a portion of a pivot pin in the bearing bush, FIG. 4 a partial side view of a mechanism component embodying a bearing arrangement according to the invention, FIG. 5 an elevation in section on the line V—V in FIG. 4, and FIG. 6 a view corresponding to FIG. 4 but showing a pivot pin located in the bearing arrangement.

The bush illustrated in FIGS. 1, 2 and 3 comprises a body portion in the form of an inner sleeve 10 and mounting means in the form of an outer sleeve 11 co-axial with and spaced from the inner sleeve 10. The inner sleeve 10 and outer sleeve 11 are interconnected and provided with an annular portion 12 at one end of the bush. The bush is intended to be used in a pianoforte action, and the sleeve 11 is externally reduced and bevelled at the end remote from the portion 12 to facilitate pushing this sleeve 11 into a hole in a side piece of a wooden flange (not shown). The outer surface of the sleeve 11 is provided with splines 13 parallel to the common axis of the sleeves 10 and 11 to improve the fitting and retention of the bush in the hole in the wooden flange. The external diameter of the annular portion 12 exceeds that of the sleeve 11, and the convex side surface of the portion 12 remote from the sleeves 10 and 11 can serve as a lateral abutment or side thrust bearing surface for a hammer butt or other part supported on a pivot pin P (FIG. 3) extending rotatably with radial clearance through the bore of the inner sleeve 10. When the bush is fitted into a wooden flange the flat side of the portion 12 adjacent to the sleeve 11 abuts against the surface of the side piece of the flange, and it is thus easy to ensure that the bush is accurately located in the flange. It is advantageous to make the bush as an injection moulding of a suitable synthetic plastics material (for example as known in commerce under the trademarks Delrin or Teflon) and it will be seen that the sleeves 10 and 11 diminish slightly in wall thickness from left to right in FIGURE 2 so that the moulded bush can be readily extracted from the mould in which it is formed. Extraction ribs 14 are provided to facilitate extracting the bush from the mould. When the bush is in service in a pianoforte action as described any climatic dimensional changes in the wooden flange can occur without causing the inner sleeve 10 to exert undue friction on the pivot pin.

The bearing arrangement embodied in the bush illustrated in FIGS. 1 to 3 comprises the body portion constituted by the inner sleeve 10, the bore in the body portion for allowing the pivot pin P to extend with radial clearance through said bore, and four resilient tongues 15 for exerting radial resilient pressure against the pivot pin P. The tongues 15 are formed integrally with the said body portion and are equi-spaced and extend substantially parallel to the axis of the bore. A protuberance 16 is formed on each of the resilient tongues 15 for transmitting the radial resilient pressures from the tongues 15 to the pivot pin P. Each of the protuberances 16 has a convexly rounded surface to make contact over a very small area, that is so-called "point" contact, with the pivot pin P.

FIGS. 4, 5 and 6 illustrate a portion of a mechanism component 20 (for example a hammer butt flange of a pianoforte action) of a pianoforte action or other mechanism, with a bore through which a pivot pin P (FIG. 6)

extends with radial clearance. The component 20 is a moulding of synthetic plastics material and constitutes the body portion of the bearing arrangement, being formed integrally with three equally spaced resilient tongues 15 to exert resilient pressures in radial directions against the pivot pin P. Each tongue 15 is formed with a protuberance 16 having a convexly rounded surface to make "point" contact or contact over a very small area with the pivot pin.

The tongues 15 are substantially parallel to the axis of the bore and taper slightly from their roots to their tips to facilitate the extraction of the moulded component 20 from the mould in which it is formed.

The bearing arrangements in accordance with the invention offer the advantages that it is not necessary to work within very small tolerances on the diameter of the pivot pins and the bores through which the pivot pins extend because these pins may be accommodated with radial clearance in these apertures and yet any undesirable effects due to this clearance or looseness are obviated by the resilient tongues, and it is easy to form the tongues to produce consistently an appropriate very slight degree of friction. Tests have indicated that the invention permits the economical manufacture of pianoforte actions having very desirable characteristics.

I claim:

1. A pivot pin bearing arrangement comprising in combination a plain cylindrical pivot pin and a complementary moulded synthetic plastic bearing component formed with a bore through which said pivot pin extends freely and with radial clearance in relative rotational relationship with said bearing component, said bearing component comprising at least three resilient tongues equally spaced around and extending substantially parallel to the axis of said bore, and a plurality of protuberances formed one on each of said tongues, each of said protuberances having a convexly-rounded surface making "point" contact over a very small area with said pivot pin, said protuberances being adjacent to the tips of said resilient tongues and said resilient tongues exerting inward radial forces which are transmitted through said protuberances to said pivot pin and tend to maintain said pivot pin co-axial with said bore so that there is contact between said bearing component and said pivot pin only where said protuberances each make a "point" contact with said pivot pin.

2. A pivot pin bearing arrangement as claimed in claim 1, wherein said bearing component is in the form of a bush comprising an inner sleeve and an outer sleeve, said inner sleeve being formed with said bore and integrally interconnected at one end with said outer sleeve, said outer sleeve being co-axial with and radially spaced from and surrounding said inner sleeve at the end thereof remote from said one end, said resilient tongues being formed integrally with and extending from said inner sleeve at the end thereof remote from said one end at which said inner sleeve and said outer sleeve are interconnected, said outer sleeve surrounding and being radially spaced from said tongues.

3. A pivot pin bearing arrangement as claimed in claim 1, said bearing component being in the form of a pianoforte-action-like mechanism element having a pair of opposed side surfaces, said resilient tongues having their tips at one of said side surfaces and their roots betwixt said side surfaces.

4. The combination of a pivot pin bearing arrangement and a pianoforte action wooden element, said bearing arrangement comprising a plain cylindrical pivot pin and a complementary moulded synthetic plastic bearing component formed with a bore through which said pivot pin extends freely and with radial clearance in relative rotational relationship with said bearing component, said bearing component compirsing at least three resilient tongues equally spaced around and extending substantially parallel to the axis of said bore, and a plurality of protuberances formed one on each of said tongues, each of said protuberances having a convexly-rounded surface making "point" contact over a very small area with said pivot pin, said protuberances being adjacent to the tips of said resilient tongues and said resilient tongues exerting inward radial forces which are transmitted through said protuberances to said pivot pin and tend to maintain said pivot pin co-axial with said bore so that there is contact between said bearing component and said pivot pin only where said protuberances each make a "point" contact with said pivot pin, said bearing component being in the form of a bush comprising an inner sleeve and an outer sleeve, said inner sleeve being formed with said bore and being integrally interconnected at one end with said outer sleeve, said outer sleeve being co-axial with and radially spaced from and surrounding said inner sleeve at the end thereof remote from said one end, said resilient tongues being formed integrally with and extending from said inner sleeve at the end thereof remote from said one end at which said inner sleeve and said outer sleeve are interconnected, said outer sleeve surrounding and being radially spaced from said tongues, said bearing component further comprising an annular portion formed integrally with and having an external diameter exceeding the maximum external diameter of said outer sleeve and being located at said one end at which said inner sleeve and said outer sleeve are interconnected, said annular portion presenting a plane side surface towards said outer sleeve and a convex side surface remote from said outer sleeve, said outer sleeve being of reduced external diameter at its end remote from said annular portion, and splines formed on the outer surface of said outer sleeve parallel to the common axis of said inner sleeve and said outer sleeve, said wooden element being provided with a cylindrical hole in which said bearing component is fitted with said splines engaging the boundary of said hole and said plane side surface abutting against a side surface of said wooden element, whereby said outer sleeve accommodates dimensional changes when said wooden element swells and shrinks as climatic conditions change and said inward radial forces exerted by said resilient tongues remain substantially constant.

References Cited by the Examiner

UNITED STATES PATENTS

| 1,031,417 | 7/1912 | Brown | 308—189 |
| 1,451,428 | 4/1923 | Lontz | 308—237 |
| 3,033,624 | 5/1962 | Biesecker | 308—238 |
| 3,164,418 | 1/1965 | Biesecker. | |

FOREIGN PATENTS 895,059   4/1962   Great Britain.

MARTIN P. SCHWADRON, *Primary Examiner.*

R. F. HESS, *Assistant Examiner.*